United States Patent [19]

Haupt et al.

[11] 3,897,392
[45] July 29, 1975

[54] BRANCHED AROMATIC POLYCARBONATES

[75] Inventors: Heinrich Haupt; Dieter Freitag; Hugo Vernaleken, all of Krefeld; Kuno Wagner, Leverkusen-Steinbuechel; Kurt Findeisen, Leverkusen, all of Germany

[73] Assignee: Bayer Aktiengesellschaft, Leverkusen Bayerwerk, Germany

[22] Filed: Oct. 23, 1973

[21] Appl. No.: 408,981

[30] Foreign Application Priority Data

Nov. 9, 1972 Germany............................ 2254918

[52] U.S. Cl. .......... 260/47 XA; 260/49; 260/613 R
[51] Int. Cl. .......................................... C08g 17/13
[58] Field of Search ............. 260/47 XA, 613 R, 49

[56] References Cited
UNITED STATES PATENTS

| | | | |
|---|---|---|---|
| 3,519,605 | 7/1970 | Takakoshi | 260/47 XA |
| 3,635,895 | 1/1972 | Kramer | 260/47 XA |
| 3,799,953 | 3/1974 | Freitag et al. | 260/47 XA |

FOREIGN PATENTS OR APPLICATIONS

| | | | |
|---|---|---|---|
| 720,524 | 10/1965 | Canada | 260/47 XA |
| 715,142 | 8/1965 | Canada | 260/47 XA |

*Primary Examiner*—Wilbert J. Briggs, Sr.
*Attorney, Agent, or Firm*—Lawrence S. Pope

[57] ABSTRACT

Thermoplastic branched aromatic polycarbonates and novel ortho-ester branching agents. The polycarbonates may be characterized by structural elements of the formula

[R'(O—D—O—CO)ₙO—D—O]₃C—X' where

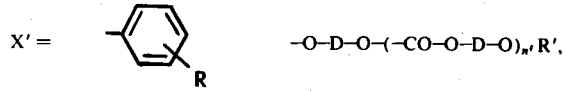

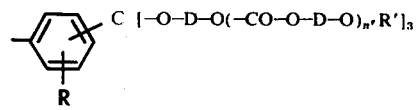

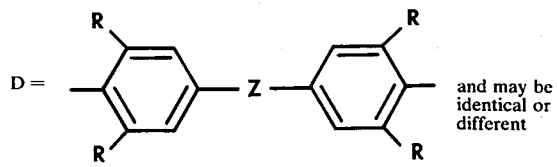

$Z = C_1$–$C_{10}$ alkylene or $C_3$–$C_{10}$ cycloalkylene, $C_2$–$C_{15}$ alkylidene or $C_3$–$C_{15}$ cycloalkylidene, a single bond, —O—, —S—, —SO—, —SO$_2$—, —CO— or

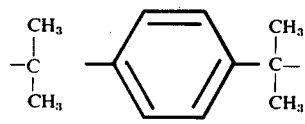

R = H, $C_1$–$C_4$ alkyl or halogen,
R' = H or —CO—O—aryl and
n,n' = identical or different, between 0 and 50, with the proviso that the sum of all n and n' in the polycarbonate molecule is at least 1.

The branching agents for the preparation of the polycarbonates include ortho-carbonic acid aryl esters and ortho-aryl esters of monocarboxylic or dicarboxylic acids and novel ortho-esters of carbonic acid or of monobasic or dibasic carboxylic acids and aromatic dihydroxy compounds, only one hydroxyl group of which is esterified.

9 Claims, 1 Drawing Figure

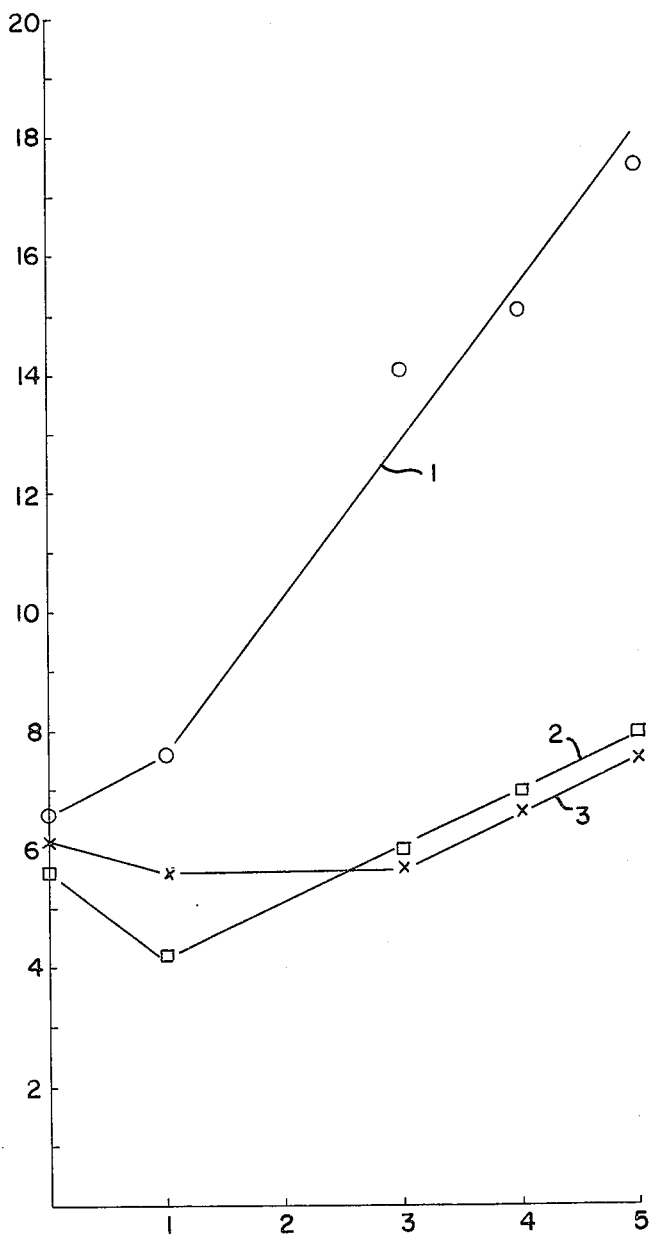

BRANCHED AROMATIC POLYCARBONATES

BACKGROUND OF THE INVENTION

The invention relates to thermoplastic, film-forming aromatic polycarbonates which have been branched by co-condensation of ortho-esters. The invention further relates to novel ortho-esters which are used for the manufacture of the said branched polycarbonates.

Branched polycarbonates possess a series of interesting properties. In particular, a high resistance to creep of the melt of branched polycarbonates facilitates processing by the blow-molding process or shaping of sheets by deep-drawing. A series of publications in which the manufacture of branched polycarbonates is described are known. In German Offenlegungschriften Nos. (German Published Specifications) 1,570,533 and 1,595,641, trivalent and tetravalent polyphenols are co-condensed in the polycarbonate as the structural element which causes the branching.

In these publications, polyphenols, such as phloroglucinol, 4,6-dimethyl-2,4,6-tri-(4-hydroxyphenyl)-heptane-2; 4,6-dimethyl-2, 4,6-tri-(4-hydroxyphenyl)-heptane or 1,1,1-tri-(4-hydroxyphenyl)-ethane are mentioned as branching agents. Since the purification of these oxidation-sensitive polyphenols is difficult, branching agents of this nature easily cause a discoloration of the polymer which is extremely undesirable, especially in the case of transparent articles such as are employed in lighting technology.

The employment of polyphenols can also be restricted because of the hydroxyl groups showing differences in reactivity due to steric reasons. One such compound is 2,6-bis-(4-hydroxybenzyl)4-methylphenol, described in German Offenlegungsschrift No. (German Published Specification) 1,595,641; hence the formation of branches using this trisphenol is rendered very difficult.

German Offenlegungsschrift No. (German Published Specification) 1,595,762 describes attempts to branch aromatic polycarbonates by means of compounds of mixed functionality. If 75% incorporation is observed for such a compound, such as, for example, diphenolacid, then this only means that at least one functional group has reacted. Such a finding as yet discloses nothing with regard to branching.

The attempt to branch polycarbonate by co-condensation of bisphenol with phosgene No. and cyanuric acid chloride, as described in U.S. Pat. Spec. No. 3,541,049, also has not proven entirely successful under the customary condensation conditions for aromatic polycarbonates.

SUMMARY OF THE INVENTION

It has now been found that polycarbonates can be branched in a new, surprisingly simple manner, via so-called ortho-ester structures. These branched copolycarbonates display superior properties, such as minimum intrinsic color and excellent heat stability. Maximum degrees of branching, such as were not produced by the branching agents hitherto known, are obtained in relation to the proportion of branching component employed. In addition, even a small proportion of the orthoester structures in polycarbonates containing halogen causes a drastic improvement in the self-extinguishing behavior in appropriate burning tests.

DETAILED DESCRIPTION

The starting compounds for achieving branching in the manufacture of the polycarbonates according to the invention are the known so-called ortho-carbonic acid aryl esters, such as ortho-phenyl carbonate, $(PhO)_4C$, and the corresponding nuclear-alkylated and nuclear-halogenated compounds; and also the novel ortho-aryl esters of arylmonocarboxylic and aryldicarboxylic acids, such as benzoic acid ortho-phenyl ester, terephthalic acid ortho-phenyl ester, isophthalic acid ortho-phenyl ester and the corresponding nuclear-alkylated and nuclear-halogenated derivatives. Suitable ortho-aryl esters can be illustrated by the following formula $$(R_1-O-)_3C-Y$$

in which

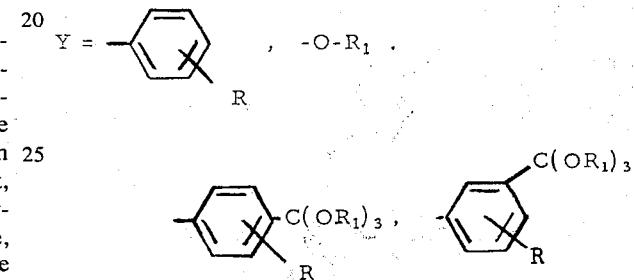

$R_1$ = aryl, preferably $C_6-C_{21}$ and
$R$ = H, $C_1-C_4$ alkyl and halogen, like chlorine or bromine.

In the above general formula if $Y = -O-R_1$, the formula is representative of the ortho-carbonic acid aryl esters. If Y =

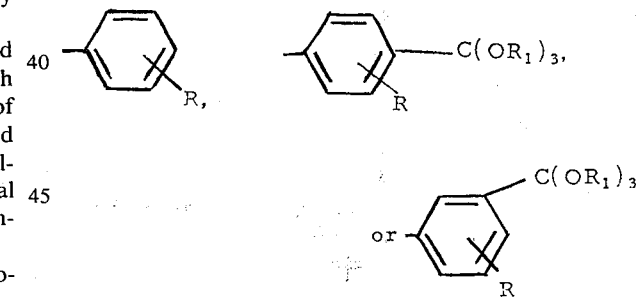

the formula is representative of the ortho-aryl esters of arylmonocarboxylic and aryldicarboxylic acids, and more specifically, of the orthoaryl esters of benzoic, terephthalic and isophthalic acids, respectively. The term ortho-ester as used generically herein, includes the ortho-esters of carbonic acid as well as the ortho-esters of the monobasic or dibasic carboxylic acids and, of course, includes the ortho-aryl esters of each of these. The ortho-aryl esters described above may be prepared according to methods known in the art as illustrated, for example, in Examples 8 and 9.

The processes known for the synthesis of polycarbonates, such as the trans-esterification process, the solution condensation process and the phase boundary condensation process are very suitable for the manufacture of the polycarbonates according to the invention.

In the trans-esterification process, the above described ortho-esters can be used directly in the trans-esterification of bisphenols with diaryl carbonates to obtain the polycarbonates according to the the invention in one step. It is necessary, however, for the processes of solution condensation and phase boundary condensation, to convert the above-identified ortho-esters, by intermediate esterification with aromatic dihydroxy compounds, as illustrated in equations 1(a) to (c), into a form of the branching agent pre-condensates which are reactive for these processes. The pre-condensates are themselves ortho-esters of carbonic acid or of monobasic or dibasic carboxylic acids, especially of aromatic carboxylic acids, and aromatic dihydroxy compounds, only one of the two hydroxy groups of which is esterified. These ortho-ester pre-condensates may be prepared according to the following formulas:

(1a)  $(R_1-O)_4C + 4\ HO-D-OH \rightarrow (HO-D-O)_4C + 4\ R_1OH$

1b) 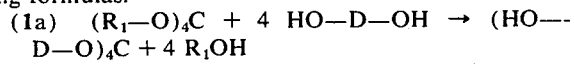

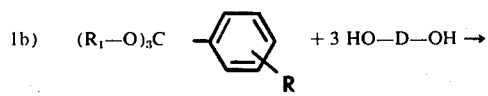

1c) 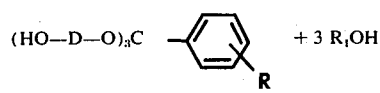

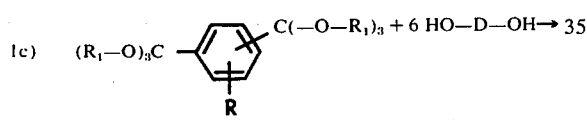

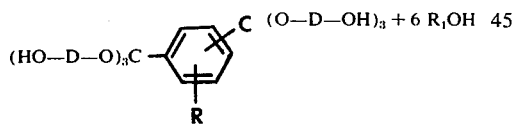

D = 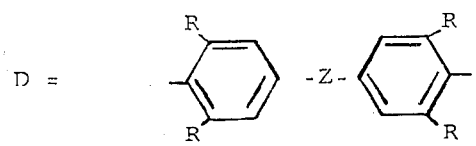

Z = $C_1-C_{10}$ alkylene or $C_3-C_{10}$ cycloalkylene, $C_2-C_{15}$ alkylidene or $C_3-C_{15}$ cycloalkylidene, a single bond, —O—, —S—, —SO—, —SO$_2$—, —CO or

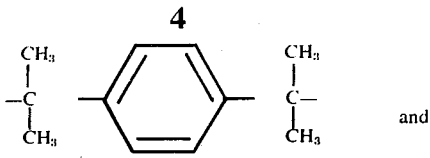

R = H, $C_1-C_4$ alkyl or halogen, like chlorine or bromine.

For this purpose, the reaction mixture of ortho-aryl ester and dihydroxy compound is heated to temperatures between 150 and 250°C. In general, a reaction time of 10–120 minutes suffices. The reaction mixture which is then present can be used directly for the manufacture of the polycarbonates of the invention. In the manufacture of the branching agent pre-condensates, 1 mol of the ortho-ester of carbonic acid, for example, the ortho-aryl ester, is reacted with at least 4 mols of dihydroxy compounds; one ortho-ester equivalent of the ortho-esters of the monocarboxylic or dicarboxylic acids is reacted with at least 3 mols of dihydroxy compound. It is frequently advisable, however, to employ a major excess of the dihydroxy compound in order to displace the equilibrium of the trans-esterifiation reaction in favor of the branching agent pre-condensates. For example, the ortho-aryl esters are used in amounts of about 1–33 mol %, preferably 5–15 mol %, relative to the dihydroxy compound.

The branching agent pre-condensates prepared according to equations 1(a) to (c) may be further illustrated by the following general formula

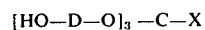

where X = 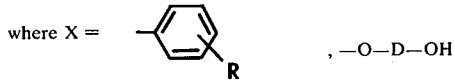

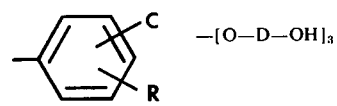

and D and R are defined as above.

The branching agent pre-condensates thus obtained can then be employed as the branching agent in the manufacture of the polycarbonates according to the invention by the solution polycarbonate process. If, for example, the phase boundary condensation process is used, the branching agent pre-condensate together with the aromatic dihydroxy compounds can be dissolved in aqueous sodium hydroxide solution and be reacted with phosgene, after addition of the solvents, chain stoppers and catalysts customary for the synthesis of polycarbonate, to give the polycarbonates according to the invention. The pre-condensates are preferably employed in amounts of 0.05–1 mol% relative to aromatic dihydroxy compounds.

Practically all dihydroxy compounds described for the synthesis of polycarbonate can be used for the manufacture of the polycarbonates according to the invention.

Suitable dihydroxy compounds are those defined above as OH—D—OH such as, for example, 4,4'-dihydroxydiphenyl, bis-(hydroxyphenyl)-alkanes, -cycloalkanes, sulfides, -ethers, -ketones, -sulfoxides or -sulfones, and also α, α'-bis-(hydroxyphenyl)-diisopropylbenzene and the corresponding nuclear-alkylated and nuclear-halogenated compounds. Polycarbonates based on 4,4'-dihydroxydiphenylpropane-2,2-(bisphenol A), tetrachlorobisphenol A, tetrabromobisphenol A, tetramethylbisphenol A and trinuclearbisphenols, such as α,α'-bis-(4-hydroxyphenyl)-p-diisopropylbenzene, and mixtures of these compounds, are preferred.

Further bisphenols suitable for the manufacture of polycarbonate are described in U.S. Pat. Nos. 3,028,365, 2,999,835, 3,148,172, 3,271,368, 2,970,137, 2,991,273, 3,271,367, 3,280,078, 3,014,891, and 2,999,846.

The ortho-esters or the branching agent precondensates are used generally in proportions of between 0.01 and 5, preferably 0.05–1, mol% relative to the dihydroxy compounds.

In order to avoid crosslinking of the polycondensate, it is advantageous to employ monophenols as chain stoppers. Their concentration is generally 1–5 mol% relative to the dihydroxy compounds. A high concentration of branching agent also demands a high chain stopper concentration.

Suitable chain stoppers are the various monophenols such as, for example, alkyl-substituted and/or halogen-substituted phenols, especially tert.-butylphenol, phenol, 2,4,6-tri-bromophenol and pentabromophenol.

The known stabilizers, processing auxiliaries, fillers and reinforcing substances, as well as pigments and colors, may be added to the branched polycarbonates during or after manufacture.

The viscosities quoted in the examples which follow have been measured on solutions of 0.5 g of polymer in 100 ml of methylene chloride at 25°C. The relative viscosities of the branched polycarbonates of the invention will lie between 1.1 and 2.0. The average molecular weights quoted in the examples were on the one hand calculated from the relative viscosity and designated $M\eta$, or on the other hand measured by light scattering and abbreviated $M_{LS}$. The difference $M_{LS}-M\eta$ is, for a given relative viscosity, a measure of the degree of branching of the polymer. The molecular weights $M_{LS}$ of the polycarbonates of the invention are preferably between about 20.000 and 120.000.

The branched thermoplastic polycarbonates according to the invention are characterized by the following general formula (1):

[R'(O—D—O—CO—)$_n$—O—D—O—]$_3$C—X'  (1)

where X' =

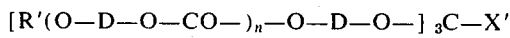

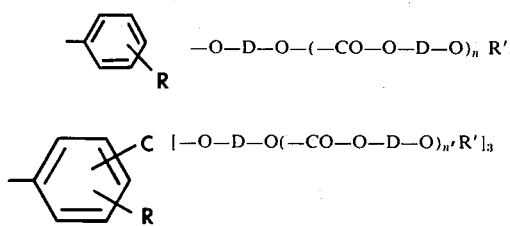

D =

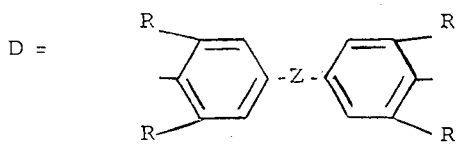

and may be identical or different

Z = $C_1$–$C_{10}$ alkylene or $C_3$–$C_{10}$ cycloalkylene, $C_2$–$C_{15}$ alkylidene or $C_3$–$C_{15}$ cycloalkylidene, a single bond, —O—, —S—, —SO—, —SO$_2$—, —CO— or

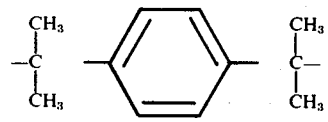

R = H, $C_1$–$C_4$ alkyl or halogen, like chlorine or bromine,

R' = H or —CO—O-aryl wherein aryl is especially phenyl, unsubstituted or substituted by alkyl or halogen, and n, n' = identical or different, 0–50, preferably 10–50 with the proviso that the sum of all n and n' in the compound of formula (1) is at least 1.

Preferred polycarbonates of the abovementioned general formula are those in which X'=—O—D—O—(—CO—O—D—O)$_n$'R'

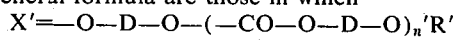

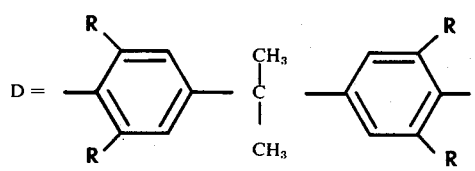

and may be identical or different,

R = H, CH$_3$, Cl or Br

R' = H, —CO—O— 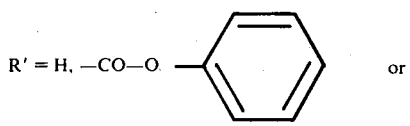 or

—CO—O— 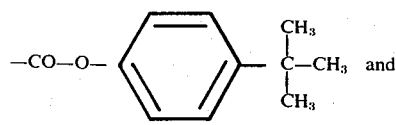 and n' = 10–50,

The branched polycarbonates are outstandingly suitable for the manufacture of blow-moldings. Because of the structural viscosity behavior of their melt, they are used preferentially in the manufacture of moldings of large surface area, such as sheets, and extruder films. In these uses, the improved flame resistance of the polycarbonates according to the invention is particularly of advantage.

The invention is further illustrated but is not intended to be limited by the following examples in which all parts and percentages are by weight unless otherwise specified.

EXAMPLE, 1

Tetra-(4-(2-(4-hydroxyphenyl)-isopropyl)-phenylorthocarbonate.

1 mol of tetraphenyl ortho-carbonate and 12 mols of 2,2-bis-(4-hydroxyphenyl)-propane are fused in a glass flask, while excluding oxygen. The phenol formed is distilled off in vacuo over the course of one hour at a heating bath temperature of 180°–200°C. 330 g of phenol collect in the receiver.

The contents of the flask are allowed to cool and the glassy product is ground in a hammer mill. This precondensate is employed as a branching component, see Examples 3a and 4.

A part of the powder, which can be employed without further treatment for the manufacture of branched polycarbonate is extracted with methylene chloride in a Soxhlet. 14 g of the desired compound are thus extracted, in the form of a colorless glass, from 45 g of the powdered mixture:

$C_{61}H_{60}O_8$ (921.15): Calculated: C, 79.57%; H, 6.57 % Found: C, 79.4 %; H, 6.68 %.

EXAMPLE 2

22.8 g of 2,2-bis-(4-hydroxyphenyl)-propane, 22.7 g of diphenyl carbonate, 0.2 mg of the sodium salt of 2,2-bis-(4-hydroxyphenyl)-propane and 58.0 mg of the ortho-carbonic acid tetraphenyl ester are mixed in a 100 ml flask having a stirrer and vacuum distillation head.

After evacuating the flask 3 times and balancing the pressure with nitrogen, the following procedure is adopted:
Heat for 1 hour at 100 mm Hg to 200°C
Stir for 1 hour at 100 mm Hg and 200°C
Stir for 2 hours at 100 mm Hg and 240°C
Stir for one-half hour at 10 mm Hg and 240°C
Stir for 1 hour at 1.2–0.6 mm Hg and 285°C
Relative viscosity 1.330
$M_{LS}$: 49,000

EXAMPLE 3 a. 57 kg of a solution of 129 kg of 2,2-bis-(4-hydroxyphenyl)-propane, 12 kg of 2,2-bis-(4-hydroxy-3,5-dibromophenyl)-propane, 631 kg of water, 103 kg of 45% strength sodium hydroxide solution, 50 g of sodium borohydride, 3,000 g of tert.-butylphenol and 1.57 kg of the precondensate of Example 1, (0.1 mol % of branching agent, relative to the sum of the bisphenols) are continuously reacted hourly, in a suitable reaction vessel, with 4.75 kg of phosgene in 90 kg of methylene chloride/chlorobenzene, 1:1, and 1.9 kg of sodium hydroxide solution, while stirring vigorously. The precondensate thus obtained is mixed, per hour with a solution consisting of 60 g of triethylamine, 1.8 kg of 45% strength sodium hydroxide solution and 50 kg of water and is condensed further in a stirred kettle cascade over the course of an average dwell time of 30 minutes. The organic phase is separated off and washed with 2% strength phosphoric acid and three times with pure water. After evaporating the solvent, a polymer of relative viscosity 1.288, $M_{LS}$: 35,000, is obtained.

The Yellowness Index, measured according to ASTM - D 1925-63 T is 4. The sample shows a surprisingly favorable burning behavior, namely SEO according to UL Subject 94.

b. An unbranched polycarbonate manufactured under the same conditions as Example 3a, with the same proportion of 2,2-bis(4-hydroxy-3,5-dibromophenyl)-propane and of relative viscosity 1.275, corresponds to Class II only, in the burning test according to UL Subject 94.

EXAMPLE 4

61.2 kg of a solution of 48.75 kg of 2,2-bis-(4-hydroxyphenyl)-propane, 237 kg of water, 39.4 kg of 45% strength sodium hydroxide solution, 50 g of sodium borohydride, 750 g of p-tert.-butylphenol and 648 g of the precondensate of Example 1 (equal to 0.11 mol % of branching agent, relative to bisphenol), are continuously phosgenated per hour, in a suitable apparatus, with 4.75 kg of phosgene in 90 kg of methylene chloride, with the addition of 3 kg of 45 % strength sodium hydroxide solution.

After adding 40 g/hour of triethylamine and 0.75 kg/hour of 45% strength sodium hydroxide solution, a branched polycarbonate of relative viscosity 1.32 is obtained after an average dwell time of half an hour.
$M\eta$: 33,400
$M_{LS}$: 47,900

EXAMPLE 5 (comparison example)

The following molecular weights were measured on an unbranched polycarbonate of relative viscosity 1.323 manufactured analogously to Example 4:
$M\eta$: 33,600 and
$M_{LS}$: 32,800

EXAMPLE 6 (comparison example)

61.2 kg of a solution of 48.75 kg of 2,2-bis-(4-hydroxyphenyl)-propane, 237 kg of water, 39.4 kg of 45% strength sodium hydroxide solution, 50 g of sodium borohydride, 750 g of p-tert.-butylphenol and 153 g of 2,6-bis-(2-hydroxy-5-methyl-benzyl)-4-methylphenol (equal to 0.22 mol % relative to bisphenol) are continuously phosgenated per hour, in a suitable apparatus, with 4.75 kg of phosgene in 90 kg of methylene chloride, with the addition of 3 kg of 45% strength sodium hydroxide solution. After adding 40 g/hour of triethylamine and 0.75 kg/hour of 45% strength sodium hydroxide solution, a branched polycarbonate is obtained after an average dwell time of half an hour.
Relative viscosity 1.34
$M\eta$: 36,100
$M_{LS}$: 38,800

A comparison of Examples 4, 5 and 6 confirms that the new tetrafunctional branching agents based on o-carbonic acid esters result in much greater branching of the polycarbonate than does twice as large a molar amount of known trivalent branching agents such as, for example, 2,6-bis-(2-hydroxy-5-methylbenzyl)-4-methylphenol.

In diagram I, the intrinsic colour (yellowness index ASTM-D 1925-63T on the ordinate) of the products from Examples 4 (curve 2), 5 (curve 3) and 6 (curve 1) is plotted as a function of the number of processing (number of extrusions at 280°C on the abscissa) operations.

A polycarbonate branched through ortho-carbonate structures has practically the same heat stability as unbranched polycarbonate, while a polycarbonate branched with the equivalent amount of 2,6-bis-(2-hydroxy5-methylbenzyl)-4-methylphenol shows an intense yellow-brown coloration.

EXAMPLE 7

1,145 g of phosgene are introduced over the course of 100 minutes at approx. 25°C, while stirring, into a mixture of 660 g of 2,2-bis-(4-hydroxyphenyl)-propane, 2,475 g of 2,2-bis-(4-hydroxy-3,5-dichlorophenyl)-propane, 79 g of the precondensate manufactured in Example 1 (equal to 0.3 mol % of branching agent), 75 g of p-tert.-butylphenol, 26.4 kg of water, 28.2 kg of methylene chloride and 1,720 g of 45% strength sodium hydroxide solution.

During the phosgenation, the pH value is kept at 11–11.5 by dropwise addition of 500 g of 45% strength sodium hydroxide solution. Thereafter, 24 g of triethylamine and 360 g of 45% strength sodium hydroxide solution are added and the mixture is stirred for a further 1½ hours. The organic phase is washed with 2% strength phosphoric acid and is subsequently repeatedly washed with deionized water. The solvent is evaporated off. Relative viscosity 1.240

$M_{LS}$: 50,800

EXAMPLE 8

Ortho-benzoic Acid Triphenyl Ester Preparation 376 g of phenol and 103 g of anhydrous pyridine are taken initially. 78.2 g of benzotrichloride are added dropwise thereto over the course of 20 minutes, at 53°–89°C. The reaction is allowed to continue for 4 hours at an internal temperature of 110°C and after cooling the mixture is charged onto 1 litre of ice water and extracted with methylene chloride. The organic phase is evaporated and the residue is digested with ethanol, filtered off and recrystallized from butanol. 70 g of colorless crystals of melting point 151°–153°C are obtained.

$C_{25}H_{20}O_3$ (368.41): Calculated: C, 81.50; H, 5.47. Found: C, 81.60: H,5.75.

EXAMPLE 9

Ortho-terephthalic Acid Hexaphenyl Ester Preparation 141 g of phenol are dissolved in 120 g of anhydrous pyridine. A solution of 31.3 g of hexachloro-p-xylene in 50 ml of chlorobenzene is added dropwise thereto at about 16°C. Thereafter the mixture is heated to a sump temperature of 100°C and kept at this temperature for 5 hours. After cooling, methylene chloride and water are added, the organic phase is separated off and evaporated and the residue is digested with ethanol and recrystallized from butanol/active charcoal. 25 g of colorless crystals of melting point 200°–201°C are obtained.

$C_{44}H_{34}O_6$ (658.71) Calculated: C,80.22; H, 5.20. Found: C, 79.4–79.5; H,5.69.

EXAMPLE 10

22.8 g of 2,2-bis-(4-hydroxyphenyl)-propane, 22.7 g of diphenyl carbonate, 111 mg of ortho-benzoic acid triphenyl ester, equal to 0.3 mol-% relative to bisphenol, and 0.2 mg of the sodium salt of 2,2-bis-(4-hydroxyphenyl)-propane are fused in a flask, having a stirrer and distillation head, after evacuating three times and balancing the pressure by means of nitrogen.

The trans-esterification takes place under the following conditions:

| Time (minutes) | Temperature (°C) | Vacuum (mm Hg) | Distillate (ml) |
|---|---|---|---|
| 30 | 200 | 100 | 10.4 |
| 30 | 220 | 100 | 13.8 |
| 30 | 250 | 100 | 15.8 |

-Continued

| Time (minutes) | Temperature (°C) | Vacuum (mm Hg) | Distillate (ml) |
|---|---|---|---|
| 30 | 250 | 50 | |
| 15 | 250 | 12 | |
| 30 | 280 | 12 | |
| 150 | 300 | 2 | |

A clear, pale yellow polycondensate is obtained.
$\eta_{rel}$: 1.202

EXAMPLE 11

The manufacture of a polycarbonate is carried out analogously to Example 10, using 131 mg (0.20 mol%) of ortho-terephthalic aicd hexaphenyl ester. The resulting polycondensate has a relative viscosity of 1.265.

What is claimed is:

1. Thermoplastic branched polycarbonates consisting essentially of the reaction products of aromatic dihydroxy compounds and ortho-aryl esters of carbonic acid or of monocarboxylic acids or dicarboxylic acids with polycarbonate precursors wherein the ortho-aryl esters are reacted in amounts of 0.01 to 5 mol percent relative to the amount of dihydroxy compound.

2. The polycarbonates of claim 1 wherein the aromatic dihydroxy compounds are selected from the group consisting of: 2,2-bis-(4-hydroxyphenyl)-propane; 2,2-bis-(4-hydroxy-3,5-dibromophenyl)-propane; 2,2-bis-(4-hydroxy-3,5-dichlorophenyl)-propane and α,α'-bis-(4-hydroxyphenyl)-p-diisopropylbenzene.

3. The polycarbonates of claim 1 wherein the ortho-aryl esters are selected from the group consisting of ortho-phenyl carbonate, benzoic-acid ortho-phenyl ester; terephthalic acid ortho-phenyl ester and isophthalic acid ortho-phenyl ester.

4. Thermoplastic branched polycarbonates consisting essentially of the reaction products of polycarbonate precursors with aromatic dihydroxy compounds and ortho-ester branching agents of the formula $$(HO-D-O)_3C-X$$

where

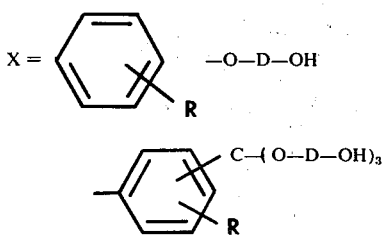

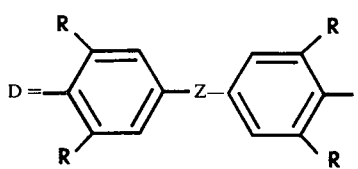

and $Z = C_1-C_{10}$ alkylene or $C_3-C_{10}$ cycloalkylene, $C_2-C_{15}$ alkylidene or $C_3-C_{15}$ cycloalkylidene, a single bond, —O—, —S—, —SO—, —SO$_2$—, —CO— or 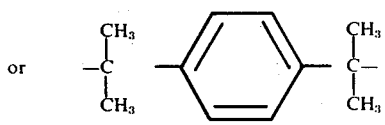

$R = H$, $C_1-C_4$ alkyl or halogen wherein the orthoaryl esters are reacted in amounts of 0.01 to 5 mol percent based on the amount of aromatic dihydroxy compound.

5. Aromatic polycarbonates of the general formula (1)

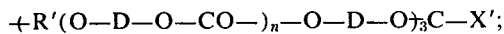

wherein

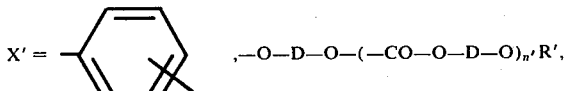

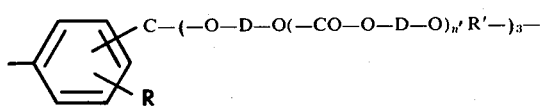

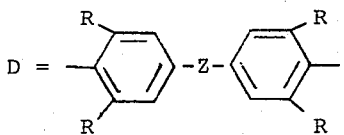

and may be identical or different, $Z = C_1-C_{10}$ alkylene or $C_3-C_{10}$ cycloalkylene, $C_2-C_{15}$ alkylidene or $C_3-C_{15}$ cycloalkylidene, a single bond, —O—, —S—, —SO—, —SO$_2$—, —CO— or

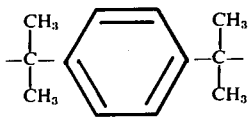

$R = H$, $C_1-C_4$ alkyl or halogen $R' = H$, or —CO—O-aryl and $n, n'0$ = identical or different, 0–50 with the proviso that the sum of all $n$ and $n'$ in the compound of formula (1) is at least 1.

6. The polycarbonates of claim 5 wherein
$X' = $—O—D—O(—CO—O—D—O)$_n'$R

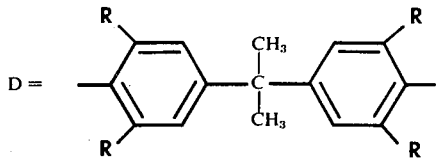

$R = H$, $CH_3$, Cl or Br $R' = H$, —CO—O— 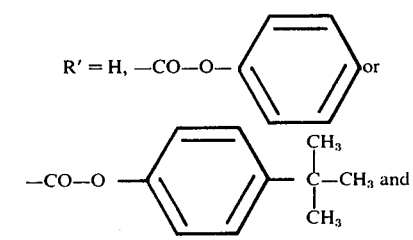

$n' = 10-50$.

7. In a process for the manufacture of branched thermoplastic polycarbonates wherein aromatic dihydroxy compounds are transesterified with diaryl carbonates in the presence of branching agents, the improvement comprising employing as the branching agents, orthoaryl esters of carbonic acid or of monocarboxylic acids or dicarboxylic acids wherein the ortho-aryl esters are reacted in amounts of 0.01 to 5 mol percent based on the amount of aromatic dihydroxy compound.

8. In the phase boundary condensation process for manufacturing branched thermoplastic polycarbonates wherein aromatic dihydroxy compounds and branching agents are dissolved in aqueous sodium hydroxide solution and reacted thereafter with phosgene, the improvement comprising employing as the branching agents 0.01 to 5 mol percent, relative to the total amounts of dihydroxy compounds employed, of orthoesters of carbonic acid or of monocarboxylic or dicarboxylic acids with aromatic dihydroxy compounds only one hydroxyl group of which is esterified.

9. The aromatic polycarbonates of claim 5 wherein $n$ and $n'$ are identical or different and each have any integer value from 10 to 50 inclusive.

* * * * *

UNITED STATES PATENT AND TRADEMARK OFFICE
CERTIFICATE OF CORRECTION

PATENT NO. : 3,897,392
DATED : July 29, 1975
INVENTOR(S) : Heinrich Haupt; Dieter Freitag; Hugo Vernaleken; Kuno Wagner; Kurt Findeisen It is certified that error appears in the above-identified patent and that said Letters Patent are hereby corrected as shown below:

First page, left column, item [73] Assignee, correct the address of the Assignee to read --Leverkusen, Germany--;

Same page, Item [57] Abstract, delete the second row of formula in the right hand column and insert Column 1, line 34, correct the spelling of --2,6-bis-(4-hydroxybenzyl)-4-methylphenol--; same column, line 49, delete "No."

Column 5, line 54, correct the second formula to read
--, -O-D-O-(-CO-O-D-O)$_n$,R', --

Column 10, line 53, correct the formula to read

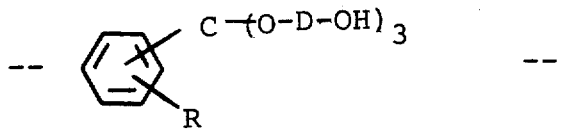

Column 11, line 10, correct the spelling of --ortho - aryl--

Column 12, line 6, correct the formula to read
--X' = -O-D-O(-CO-O-D-O)$_n$,R'--

Signed and Sealed this

Thirty-first Day of August 1976

[SEAL]

Attest:

RUTH C. MASON
Attesting Officer

C. MARSHALL DANN
Commissioner of Patents and Trademarks